United States Patent [19]

Criqui et al.

[11] Patent Number: 4,570,835

[45] Date of Patent: Feb. 18, 1986

[54] BICYCLE BEVERAGE HOLDER

[76] Inventors: William D. Criqui, 900 Buchanan, 67501; Larry L. Smith, 129 W. 24th St., both of Hutchinson, Kans. 67501

[21] Appl. No.: 584,925

[22] Filed: Feb. 29, 1984

[51] Int. Cl.⁴ ............................................. B62J 11/00
[52] U.S. Cl. ........................................ 224/36; 224/148; 224/41
[58] Field of Search .................. 224/30 A, 36, 32 R, 224/35, 39, 41, 148; 248/311.2, 224.1

[56] References Cited

U.S. PATENT DOCUMENTS

| | | | |
|---|---|---|---|
| 3,193,232 | 7/1965 | Hatcher | 224/30 A |
| 3,380,698 | 4/1968 | Goldberg et al. | 224/30 A |
| 4,071,175 | 1/1978 | Wagnon | 224/36 |
| 4,256,281 | 3/1981 | Harris et al. | 224/30 A |

Primary Examiner—Stephen Marcus
Assistant Examiner—David Voorhees
Attorney, Agent, or Firm—Edwin H. Crabtree

[57] ABSTRACT

A beverage container holder for mounting on a bicycle handle bar and the like. The holder providing a convenient and accessible place for carrying and storing various sizes and different types of containers and allowing the operator to free both hands during the operation of the bicycle.

1 Claim, 3 Drawing Figures

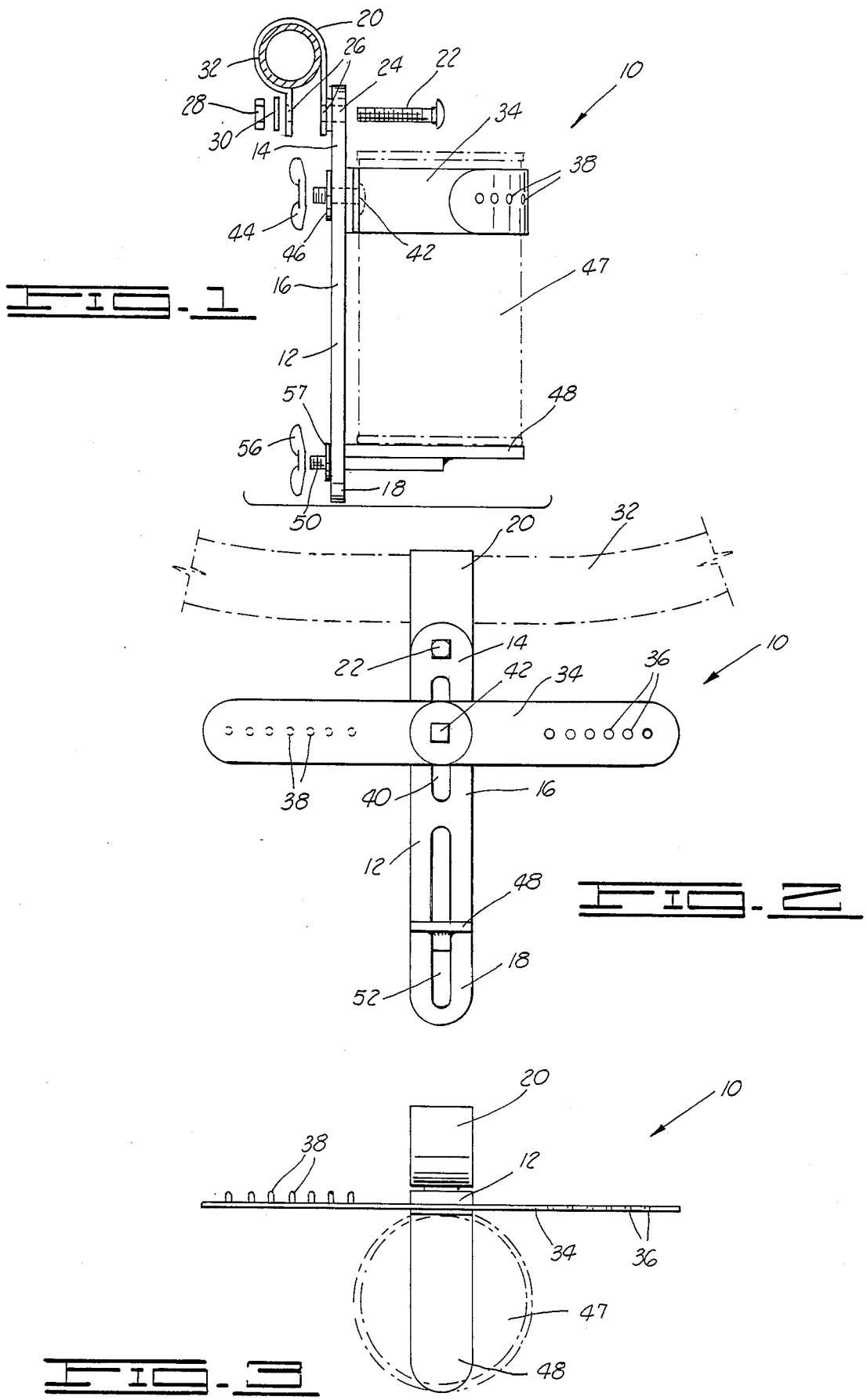

BICYCLE BEVERAGE HOLDER

BACKGROUND OF THE INVENTION

This invention relates to a beverage container holder and more particularly but not by way of limitation to a beverage container holder for mounting on bicycle handle bars, motor cycle handle bars and various types of vehicles using handle bars.

Heretofore, there have been various types of container carriers, bottle carriers, handle mounting devices and carriers for holding different types of containers. These devices are described in the following patents: U.S. Pat. No. 3,840,153 to Devlin, U.S. Pat. No. 4,009,810 to Shook, U.S. Pat. No. 4,088,250 to Schaefer, U.S. Pat. No. 4,071,175 to Wagnon, U.S. Pat. No. 4,312,465 to Sinkhorn et al. None of the above mentioned patents specifically describe the unique features and combination of structure of the subject beverage container holder as described herein.

SUMMARY OF THE INVENTION

The subject beverage container holder is simple in design and can be quickly and conveniently mounted on a bicycle handle bar, motor cycle handle bar and various types of transportation vehicles using handle bar type arrangements.

The holder provides a convenient place for carrying and storing different types and sizes of containers and allowing the operator to be free to use both hands for the safe use of the vehicle. Also, the container is quickly accessible for drinking from the container since the container is held adjacent the handle bar and in front of the operator.

The beverage container holder provides an adjustable strap for securing various types and sizes of containers. Also, the container can be adjusted vertically or at various angles from the vertical in carrying the beverage container.

The beverage container holder for mounting on a bicycle handle bar and the like includes a vertical back plate having an upper portion, a center portion and a lower portion. A clamp is attached to the upper portion of the back plate and adapted for securing the holder to the handle bar. A strap is attached to the center portion of the back plate and is adapted for receiving various sizes of beverage containers. An adjustable bottom plate is mounted on the lower portion of the back plate and can be raised and lowered for allowing the container to be rested thereon.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates a side view of the beverage container holder.

FIG. 2 illustrates a front view of the beverage container holder.

FIG. 3 illustrates a top view of the beverage container holder.

DETAILED DESCRIPTION OF THE DRAWINGS

In FIG. 1 the beverage container holder is designated by general reference numeral 10. The holder 10 includes a vertical back plate 12 having an upper portion 14, a center portion 16 and a lower portion 18. Attached to the upper portion 14 of the back plate 12 is a "U" shaped clamp 20 having a threaded bolt 22 received through an aperture 24 in the upper portion 14 of the plate 12 and received through a pair of apertures 26 in the ends of the clamp 20. The bolt 22 is received through a washer 30 and attached to a nut 28 for securing the holder 10 to a handle bar 32 shown in cross-section.

An elongated strap 34 having a plurality of apertures 36 in one end and a plurality of knobs 38 in the other end is adjustably mounted in a strap adjustment slot 40 shown in FIG. 2 and attached thereto by a bolt 42 received through the slot 40 and secured thereto by a wing nut 44 with washer 46. The slot 40 runs vertically along the length of the center portion 16 of the back plate 12.

Shown in FIG. 1 and in dotted lines is a typical beverage container 47 with the adjustment strap 34 securing the container 47 to the holder 10. The bottom of the container 47 rests on a bottom plate 48 which is also adjustably mounted to the lower portion 18 of the back plate 12 with the bottom plate having a threaded end portion 50 received through a bottom plate adjustment slot 52 with the threaded end 50 secured by a wing nut 56 with washer 57. By sliding the bottom plate 48 vertically along the length of the bottom plate adjustment slot 52, the bottom plate 48 can be adjusted for various lengths of containers 47.

In FIG. 2 the adjustment strap 34 can be seen in an opened position ready for receiving a container on top of the bottom plate 48 and securing the container to the holder 10. Also seen in this view, is a portion of the handle bar 32.

While normally, the holder 10 would be mounted vertically, it should be kept in mind, by adjusting the threaded bolt 22 on the clamp 20, the back plate 16 can be adjusted at various angles from the vertical should the operator desire to hold the container 47 in various positions and at angles from the vertical. Also, the back plate 12 could be adjusted to swing freely if so desired and allow the container 47 to remain upright while the bicylce is tilted into different positions.

Also seen in FIG. 2 is the strap adjustment slot 40 and bottom plate adjustment slot 52 which allows the strap 34 and bottom plate 48 to be adjusted vertically for various sizes and types of container.

In FIG. 3 a top view of the holder 10 is shown with again the adjustment strap 36 in an opened position with the container 47 shown in dotted lines and received on top of the bottom plate 48 and in a position to be secured to the holder 10 by the adjustment strap 36.

From reviewing the above mentioned drawings, it can be appreciated the subject beverage container holder 10 is simple in design, rugged in construction and can be easily adapted and attached to various types of handle bars used with bicycles, motor cycles and the like. Further the container holder 10 can be adjusted for keeping the container 47 in an upright position to prevent the spilling of a liquid from the container and freeing both hands of the operator during the operation of the bicycle.

Changes may be made in the construction and arrangement of the parts or elements of the embodiments as described herein without departing from the spirit or scope of the invention defined in the following claims.

What is claimed is:

1. A beverage container holder for mounting on a bicycle handle bar and the like, the holder comprising:

a back plate having an upper portion, a center portion with a strap adjustment slot along the length of the center portion, and a lower portion having a bottom plate adjustment slot along the length of the lower portion;

a "U" shaped clamp attached to the upper portion of the back plate and having a threaded bolt received through an aperture in the upper portion of the back plate and received through a pair of apertures in the ends of the clamp, the clamp adjustably mounted on the back plate and adapted for securing the holder to the handle bar and allowing the holder to be adjusted vertically and at various angles from the vertical, the clamp suspending the back plate downwardly from the handle bar;

strap means attached to the center portion of the back plate and adjustably mounted thereon, the strap means adapted for receiving various sizes of beverage containers, the strap means vertically adjustable along the length of the strap adjustment slot; and a horizontal bottom plate having a threaded end portion received through the bottom plate adjustment slot and secured thereto by a wing nut, the bottom plate adjustable along the length of the bottom plate adjustment slot for raising and lowering the bottom plate and resting the beverage container on the top thereof.

* * * * *